W. C. BERRY.
PEANUT PICKER AND PEA HULLER.
APPLICATION FILED JUNE 4, 1912.
1,061,591.
Patented May 13, 1913.
3 SHEETS—SHEET 1.
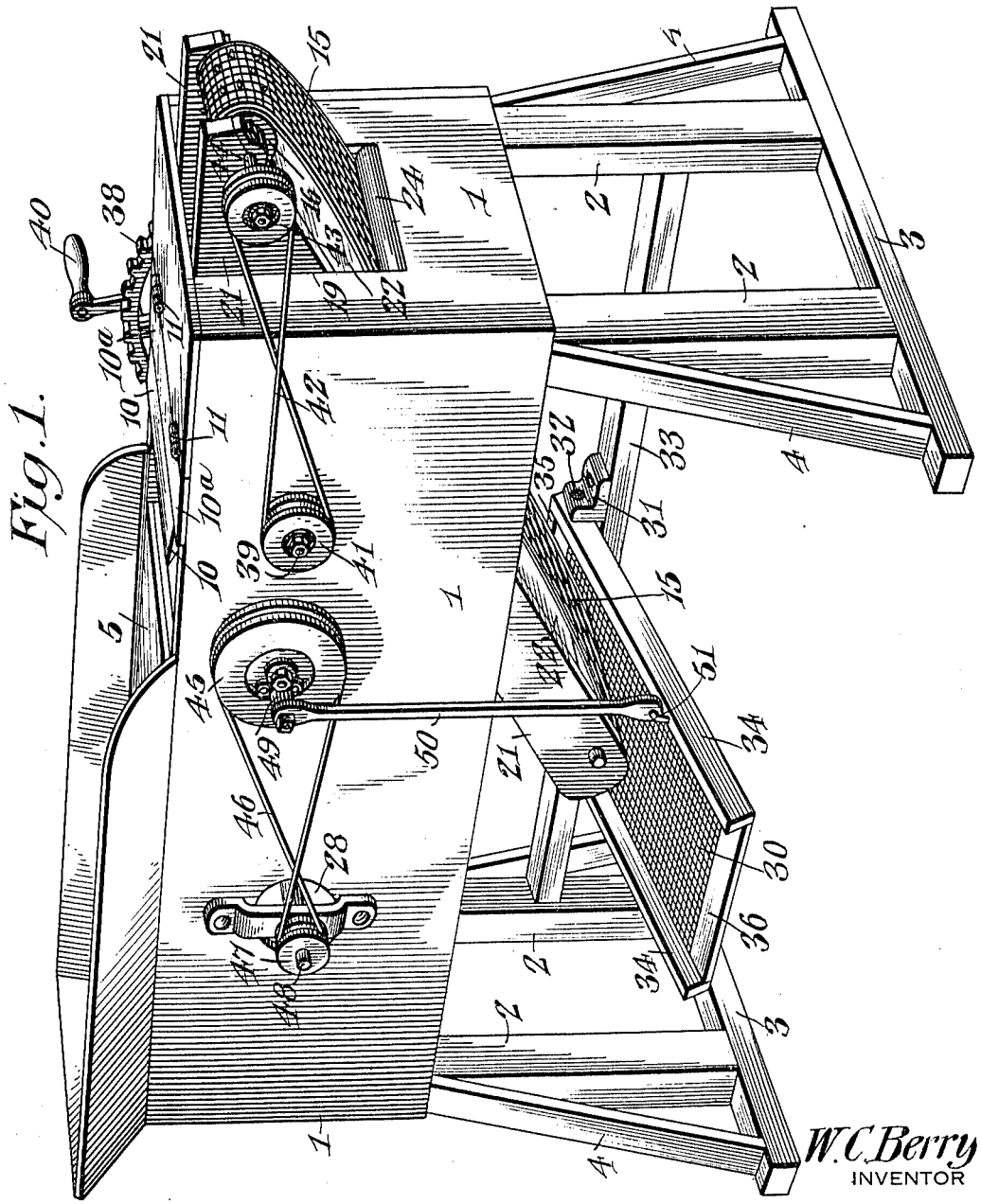
W. C. Berry
INVENTOR
WITNESSES
BY
ATTORNEY

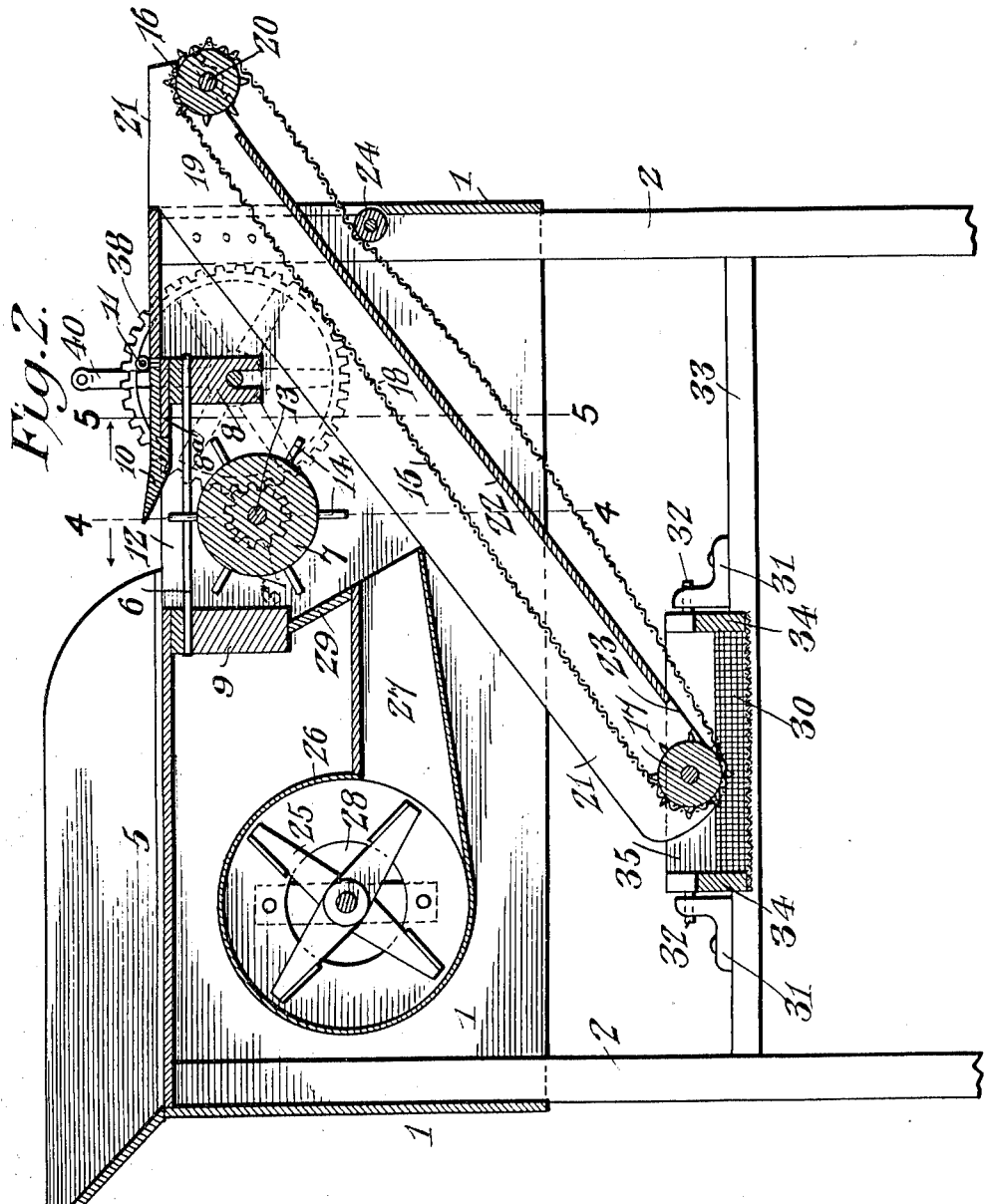

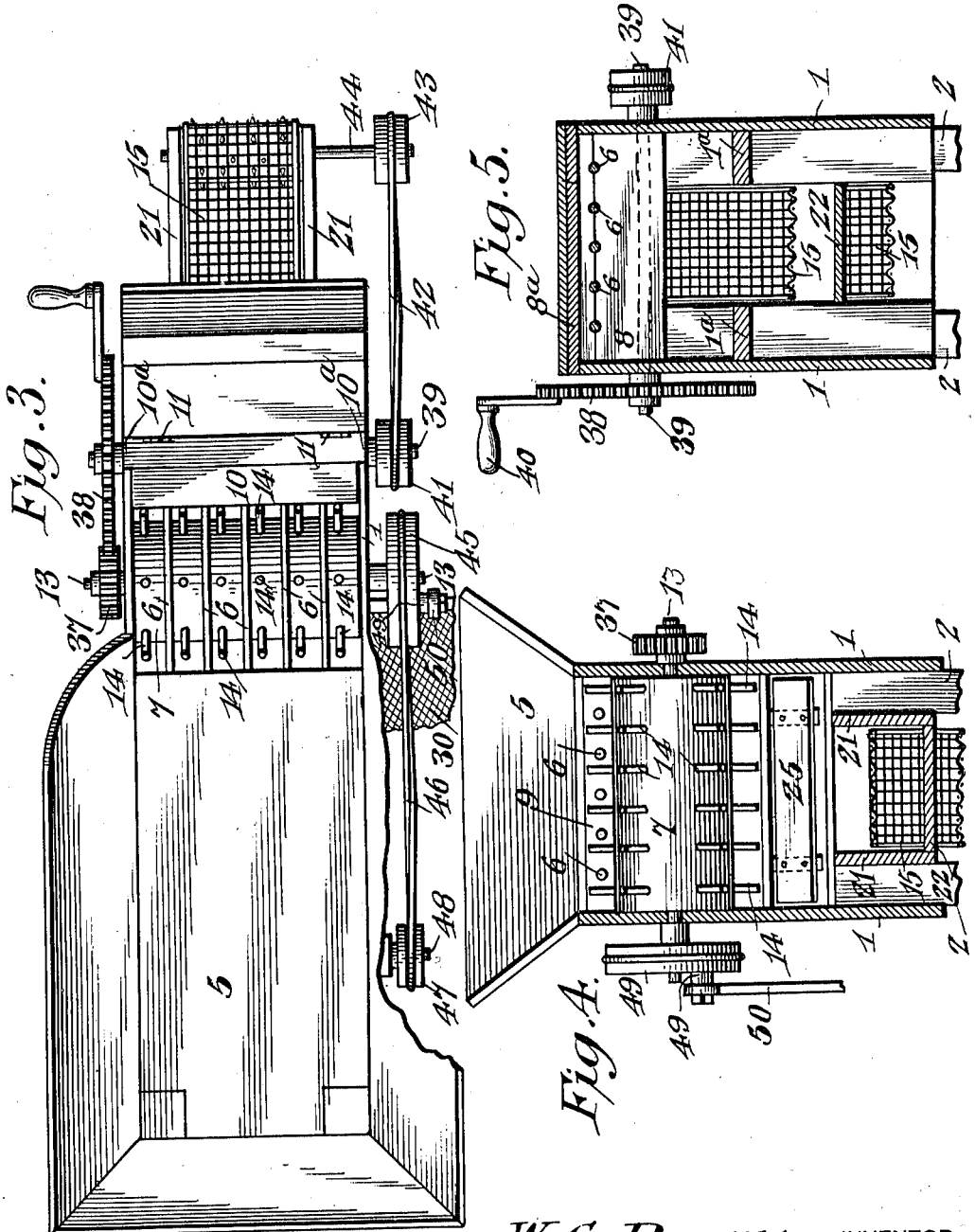

UNITED STATES PATENT OFFICE.

WILLIAM C. BERRY, OF MARSHALL, TEXAS.

PEANUT-PICKER AND PEA-HULLER.

1,061,591.  Specification of Letters Patent.  Patented May 13, 1913.

Application filed June 4, 1912. Serial No. 701,559.

*To all whom it may concern:*

Be it known that I, WILLIAM C. BERRY, a citizen of the United States, residing at Marshall, in the county of Harrison and State of Texas, have invented a new and useful Peanut-Picker and Pea-Huller, of which the following is a specification.

The invention relates to a peanut picker and pea huller.

The object of the present invention is to improve the construction of peanut pickers and pea hullers, and to provide a simple, efficient and comparatively inexpensive machine, capable of picking the peanuts from the vines instead of beating or flailing the same, whereby but a few peanuts will be damaged by such picking operation.

A further object of the invention is to provide a machine of this character, adapted to be operated at the expenditure of a minimum amount of power, and capable of discharging the peanuts or peas free from dust.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a peanut picker and pea huller, constructed in accordance with this invention. Fig. 2 is a longitudinal sectional view of the same. Fig. 3 is a plan view, one side of the hopper being broken away to show the fan operating belt. Fig. 4 is a transverse sectional view on the line 4—4 of Fig. 2. Fig. 5 is a similar view on the line 5—5 of Fig. 2.

Like numerals of reference designate coresponding parts in all the figures of the drawings.

In the embodiment of the invention illustrated in the accompanying drawings, the machine comprises in its construction a substantially oblong casing 1, supported by corner uprights or legs 2, preferably secured to end sills 3 and braced by inclined bars 4. The casing, which is open at the bottom, is composed of side and end walls, and it is equipped at the top with a hopper 5, extending inwardly from one end of the machine and composed of a horizontal bottom and inclined side and end walls, and open at its inner end to deliver the pea or peanut vines to a grid or grating, formed by spaced longitudinal rods 6, arranged horizontally above a rotary picking cylinder 7, and adapted to expose the vines to the action of the same. The rods are mounted at their ends in transverse bars or beams 8 and 9, suitably secured between the sides of the casing and spaced apart to permit the vines to pass into the casing.

The casing is equipped at the top with a guiding leaf 10, secured by suitable hinges 11 to the frame or casing of the machine at the back of the opening or space 12 between the transverse beams 8 and 9, and adapted to be adjusted upward or downward for guiding the material to the rotary picking cylinder 7. The free edge or portion 12 of the guiding leaf 10 is set at an angle or inclination and is beveled at the inner or lower face, as clearly shown in Fig. 2, and extends entirely across the space between the side walls of the casing. The hinged leaf is provided in rear of the beveled inclined portion with laterally projecting portions $10^a$, which rest upon the upper edges of the side walls of the casing, and the rear portion of the hinged leaf extends over a horizontal wall or partition $8^a$, while the beveled inclined portion is adapted to extend downwardly between the side walls. The rotary picking cylinder, which is mounted on a transverse shaft 13, is provided with spikes or pins 14, extending radially from the circumference of the cylinder, and adapted to engage the vines and the nuts or peas, which are thereby drawn into the machine. Located below the rotary picking cylinder is an inclined endless carrier 15, mounted upon upper and lower transverse rolls 16 and 17 and constructed of woven wire, or other suitable material provided with interstitial openings or meshes 18 of a size to permit the peanuts to readily fall through them, whereby the endless conveyer is adapted to coöperate with the picking cylinder in separating the peanuts and peas from the vines, and is also capable of carrying the vines outward and discharging them from the machine at one end thereof. The endless conveyer projects through an opening 19 in one end of the casing, and the shaft 20 of the upper roll is journaled in suitable bearings of projecting sides 21 of an inclined guide or chute 22. The shaft of the lower roll is journaled in suitable bearings of the sides of the chute at the lower end thereof. The upper and lower rolls are provided with spikes or teeth to engage the openings of the endless conveyer, which may consist of a chain belt and be formed by links. The peanuts or peas, which fall through the openings in the upper flight of the endless conveyer 15, slide down the inclined guide or chute 22, which projects through the opening 19 and also from the bottom of the casing, as clearly shown in Figs. 1 and 2 of the drawings. The sides of the inclined chute 22 are secured to the adjacent legs or uprights of the frame or casing, and the inclined bottom of the chute is located between the upper and lower flights of the endless conveyer and terminates short of the upper and lower rolls 16 and 17. The lower opening 23 between the bottom of the chute and the lower roll provides a passage-way or outlet for the peanuts or peas. The spaces between the upper portions of the sides of the chute and the casing of the machine are closed by inclined side pieces 1ª, which prevent peanuts from dropping through the space between the chute and the side walls of the casing. The lower flight of the endless conveyer passes over a transverse idler roll 24, located at one end of the casing at the bottom of the opening 19, and adapted to support the lower flight and prevent the same from sagging and dragging over the end wall at the opening 19.

The vines are not finely divided or pulverized by the action of the machine, and they are assisted through the outlet 19 by a fan 25, operating within a casing 26 having a discharge mouth or trunk 27, located at a point below the picking roll and arranged to discharge a blast of air opposite the space between the picking roll and the upper flight of the endless conveyer, as clearly illustrated in Fig. 2 of the drawings. The fan casing is provided at the sides of the machine with intake eyes or openings 28, and the space between the mouth or trunk 27 and the transverse beam 9 is closed by a partition 29 for excluding the vines from the space between the fan and the hopper. The side bars or pieces 1ª extend from the mouth or air trunk of the fan casing to the legs to which the inclined chute 22 is secured.

The picked peanuts or peas fall upon an inclined vibratory screening chute 30, disposed transversely of the machine and arranged centrally beneath the casing, and secured at one end between supporting brackets 31 by suitable pivots 32, which permit the screening chute to swing upwardly and downwardly, whereby the material is shaken or vibrated to sift the same and remove the dust therefrom. The brackets 31 are secured to a horizontal supporting bar 33, extending longitudinally of the machine at one side thereof and secured to the adjacent corner legs or uprights. The sifting or screening chute 30, which is inclined, is provided with an oblong frame composed of spaced sides 34 and transverse end bars 35 and 36. The sides 34 and the transverse bar 35 form walls at the sides and top of the screening chute, and the screen material is secured to the lower edges of the sides 34 and the transverse bar 35, and the lower transverse bar 36 is secured between the side bars 34 with its upper and lower faces in parallelism with the screen material.

The machine may be operated either manually or by means of any suitable motor, and mounted upon one end of the shaft 13 of the picking cylinder is a pinion 37, meshing with the actuating gear 38 of a transverse shaft 39. The gear 38, which is equipped with a crank handle 40, is arranged at one side of the machine, and the shaft 39 is provided at the opposite side of the machine with a pulley 41, connected by a crossed belt 42 with a pulley 43, fixed to the shaft 44 of the upper roll 16 of the endless conveyer, whereby the latter is actuated and the upper flight thereof caused to travel upwardly for discharging the vines from the machine.

A combined crank wheel and pulley 45 is mounted on the shaft 13 of the picking cylinder at the side of the machine opposite that at which the pinion 37 is arranged, and it is connected by a crossed belt 46 with a pulley 47 of a fan shaft 48 for driving the fan. The combined pulley and crank wheel 45 is provided with a wrist pin 49 and is connected by a pitman 50 with the vibratory screening chute 30 at one side thereof, whereby the screening chute is oscillated for shaking and sifting the peanuts, peas, or other material picked or separated by the machine. The screening chute is connected with the lower end of the pitman 50 by means of a staple 51, or other suitable means.

Having thus fully described my invention, what I claim as new and desire to secure by Letters Patent, is:—

1. A machine of the class described comprising a casing provided with a hopper having a bottom and open at one end, a rotary picking cylinder arranged within the casing below the open end of the hopper and provided with projecting spikes or teeth, supports located above the picking cylinder and extending from the open end of the hopper and spaced apart to permit vines to pass between them, and an adjustable guiding leaf also located above the picking cylinder and arranged opposite the open end of the hopper.

2. A machine of the class described comprising a casing provided with a hopper having a bottom and open at one end, a rotary picking cylinder arranged within the casing below the open end of the hopper and provided with projecting spikes or teeth, spaced supports located above the picking cylinder, and an adjustable guiding leaf also located above the picking cylinder and spaced from and arranged opposite the open end of the hopper, said guiding leaf being hinged and having an inclined beveled portion.

3. A machine of the class described including a casing provided with a hopper having a bottom and open at one end, a hinged guiding leaf mounted on the casing opposite the open end of the hopper in spaced relation with and presenting a lower inclined face for directing the material downwardly, and picking mechanism arranged within the casing and below the space between the hopper and the said leaf.

4. A machine of the class described comprising a casing provided with a hopper having a bottom and open at one end, a rotary picking cylinder arranged within the casing below the open end of the hopper and provided with projecting spikes or teeth, supports located above the cylinder and extending from the open end of the hopper and spaced apart to permit the vines to pass between them, and guiding means located above the spaced supports and arranged opposite the open end of the hopper for guiding the vines downwardly to the picking cylinder.

In testimony, that I claim the foregoing as my own, I have hereto affixed my signature in the presence of two witnesses.

WILLIAM C. BERRY.

Witnesses:
  W. D. RAINS,
  G. E. BERRY.